United States Patent [19]

Majima

[11] Patent Number: 5,043,936

[45] Date of Patent: Aug. 27, 1991

[54] DOCUMENT EDITING SYSTEM INCLUDING OPERATOR ASSISTANCE FOR HYPHENATION

[75] Inventor: Tokiko Majima, Toyohashi, Japan

[73] Assignee: Brother Kogyo Kabushiki Kaisha, Japan

[21] Appl. No.: 262,694

[22] Filed: Oct. 26, 1988

[30] Foreign Application Priority Data

Oct. 29, 1987 [JP] Japan .................... 62-274552

[51] Int. Cl.$^5$ .................... G06F 3/12; G06F 5/00; G06F 3/14; G06F 11/00
[52] U.S. Cl. .................... 364/900; 364/225.6; 364/225.7; 364/225.8; 364/234; 364/235; 364/237.3; 364/927.4; 364/927.61; 364/928; 364/930.5; 364/943.2; 364/943.43; 364/419
[58] Field of Search ... 364/200 MS File, 900 MS File, 364/419; 340/791, 772.5, 709, 750; 400/63, 67, 83

[56] References Cited

U.S. PATENT DOCUMENTS

| | | | |
|---|---|---|---|
| 3,991,405 | 11/1976 | Boyd et al. | 364/900 |
| 4,139,902 | 2/1979 | Bodin | 364/900 |
| 4,354,765 | 10/1982 | Buchanan et al. | 364/900 |
| 4,491,933 | 1/1985 | Ursin et al. | 364/900 |
| 4,678,351 | 7/1987 | Curley | 364/900 |
| 4,782,339 | 11/1988 | Zeising et al. | 340/791 |
| 4,786,894 | 11/1988 | Furusawa et al. | 400/83 |
| 4,859,100 | 8/1989 | Carlson et al. | 400/83 |
| 4,904,099 | 2/1990 | Abe et al. | 400/83 |

FOREIGN PATENT DOCUMENTS 62-274552 10/1987 Japan .

OTHER PUBLICATIONS

IBM Technical Disclosure Bulletin, vol. 29, No. 1, Jun. 1986, pp. 383, 384.
IBM Technical Disclosure Bulletin, vol. 28, No. 9, Feb. 1986, pp. 4176-4178.
IBM Technical Disclosure Bulletin, vol. 25, No. 8, Jan. 1983, p. 4225.
Stuart E. Bonney, "The Wordstar Customizing Guide", p. 64, lines 2-3, p. 143, lines 24-29, Wordward Publishing, Inc., U.S.A., 1986.

Primary Examiner—Archie E. Williams, Jr.
Assistant Examiner—Ayni Mohamed
Attorney, Agent, or Firm—Oliff & Berridge

[57] ABSTRACT

A document data processing is disclosed including: a device for entering original data; an editing device for editing the original data into edited data; and a device for displaying a document corresponding to the edited data. The editing device includes a device for storing the original data; a device for producing the edited data representing a plurality of character lines arranged within a document zone between a left and a right margin line, by automatically moving each word which would otherwise be positioned in each character line to intersect one of the margin lines or to follow a word terminating within a hot zone adjacent to the one margin line, to the following character line; a device for selecting one of the character lines; a device for splitting the automatically moved (AM) word in a line following the selected line, into a front and a rear character row, such that a number of the characters of the front row is not more than a maximum number of the characters which can be located in the selected line without overrunning the one margin line in a supposed or theoretical situation in which the AM word were not moved to the next line, and for moving the front row to the selected line; and a device for changing the split position at which the AM word is split into the front and rear rows.

13 Claims, 5 Drawing Sheets

S10: RETURN OF FRONT CHARACTER ROW

DOCUMENT EDITING SYSTEM INCLUDING OPERATOR ASSISTANCE FOR HYPHENATION

BACKGROUND OF THE INVENTION

1. Field of the Invention

The present invention relates to a document data processing apparatus for producing documents in English or other languages, and particularly to a hyphenation assisting device for assisting an operator to conduct hyphenation of a word in such documents.

2. Discussion of the Related Art

There has been known a document data processing device which has (a) an input device for entering original document data representing an original document including a plurality of words; (b) an editing device including memory means connected to the input device, for storing the original document data, and edited data producing means for producing edited document data based on the stored original document data and data representing the positions of predetermined left- and right-hand margin lines or columns, such that a plurality of character lines represented by the edited document data are arranged within a document zone defined between the pair of margin lines; and (c) a display device connected to the editing device, for displaying an edited document corresponding to the edited document data.

English documents, for example, are written such that every word is not split into two parts. That is, English documents are written so that no words are split into front character row in a character line and a rear character row in the following or next character line. To this end, the editing device of the above-indicated processing device further comprises means for effecting an automatic line feed operation in which, if a word (or word data) is entered through the keyboard to be positioned in a character line to intersect or overrun one of the margin lines, or to be positioned in the character line to follow a word terminating within a hot zone which extends with a predetermined width thereof along the above-indicated margin line (e.g., right-hand one) inside the document zone or which consists of a predetermined number of columns up to the margin line, the word is automatically moved to the following character line.

Due to the automatic line feed, however, a comparatively large blank portion may be left following the last character of the last word in character lines, thereby deteriorating the external appearance of the edited document and also requiring a larger space on a screen or a record sheet to display or print the edited document.

The above-indicated type processing device may further be provided with means for effecting a justification operation in which, after the automatic line feed, the blank portion left following the last word in a character line is distributed substantially uniformly to each of the spaces occurring in the character line, thereby widening the spaces so as to have substantially the same length and also aligning the last character of the last word with the margin line. Thus, the processing device is free from the problem of the deteriorated external appearance of the edited document, but still suffers from the problem of the larger space occupied by the edited document.

The above-indicated second problem has conventionally been solved by splitting the word previously automatically moved from a character line to the following character line due to the automatic line feed, into a front and a rear character row, moving the front character row to the preceding line, advancing the rear character row to the other margin line, and, in most cases inserting a hyphen at a position or column following the last character of the moved front character row. Hereinafter, this operation is referred to as a hyphenation operation.

After the automatic line feed or justification, the automatically moved words may be displayed in a manner different from that in which the words other than the automatically moved words are displayed. However, such information apparently is insufficient for the operator to determine whether or not to conduct a hyphenation. For the determination, the operator is required to consider not only a width of a blank portion left in character lines in the vicinity of the margin line after the automatic line feed and/or overall distribution of words in the document zone after the justification, but also the overall distribution of words in the document zone after the hyphenation. The conventional hyphenation method is time-consuming, and requires the operator to operate many keys on the keyboard, thereby deteriorating the efficiency of production of an edited document.

SUMMARY OF THE INVENTION

It is therefore an object of the present invention to provide a document data processing apparatus which is capable of assisting the operator to conduct a hyphenation, thereby producing a more compact document with high efficiency.

The above object has been achieved by the present invention which provides a document data processing apparatus comprising: (a) an input device for entering original document data; (b) an editing device connected to the input device, for editing the original document data from the input device into edited document data; and (c) a display device connected to the editing device, for displaying an edited document corresponding to the edited document data, the editing device comprising (i) original data memory means for storing the original document data; (ii) edited data producing means for producing the edited document data representing a plurality of character lines arranged within a document zone which is defined by, and between, a pair of right- and left-hand margin lines located at respective predetermined positions, by automatically moving each word which would otherwise be positioned in each character line to intersect one of the margin lines or be positioned in each character line to follow a word terminating within a hot zone adjacent to the one margin line inside the document zone, to a next character line following the each character line; (iii) line selecting means for selecting one of the character lines represented by the edited document data; (iv) character row moving means for splitting the automatically moved word in the next character line following the selected character line, into a front and a rear character row, such that a number of the characters of the front character row is not more than a maximum number of the characters which can be located in the selected character line in the vicinity of the one margin line without overrunning the one margin line in a supposed situation in which the automatically moved word were not moved from the selected character line to the next character line, the character row moving means moving the front character row from the next character line to the vicinity of the one margin line in the selected character line; and (v) split position changing means for changing the split position at which the automatically moved word is split into the front and rear character rows. The processing apparatus of the present invention is applicable to, for example, a word processer and an electronic typewriter having an editing function.

In the processing apparatus constructed as described above, the edited data producing means is adapted to produce edited document data representing a plurality of character lines, based on the original document data stored in the original data memory means and the data representing the predetermined positions of the left- and right-hand margin lines. In this production process, the edited data producing means automatically moves each word which would otherwise be positioned in each character line to intersect or overrun one of the margin lines or to follow a word ending at a position or column within the hot zone, to the following character line. This is the automatic line feed function. Thus, the edited document data is produced such that none of the words in the edited document is split into two parts, one in a character line and the other in the following character line.

When the line selecting means selects one of the plurality of character lines in the edited document data, the character row moving means splits the automatically moved word in the next line following the selected line, into a front and a rear character row, such that a number of the characters of the front character row is not more than a maximum number of the characters can be located in the selected line without overrunning the document zone or one of the margin lines (e.g., the right-hand margin line) in a supposed (or theoretical) situation in which the automatically moved word were not moved from the selected line to the next line. It is noted that the above maximum number means the number of characters which can be located in a blank portion of a character line which is left in the vicinity of the one margin line immediately after the automatic line feed prior to any justification.

Subsequently, the character row moving means moves the front character row from the next line to the vicinity of the one margin line in the selected line. Consequently, the edited document is displayed on the display device such that the automatically moved word is split into the front character row, located in the selected line, and the rear character row, located in the next line.

Accordingly, in the processing apparatus of the invention, a document having the same, or approximately the same, form or configuration as that of the document after the hyphenation is easily displayed on the display device, leading to assisting the operator to produce a more compact document with a good external appearance, with an improved efficiency of production.

Where the automatically moved word is split at an appropriate or proper split position as a result of moving the front character row to the selected line, the operator will operate the hyphen key on the keyboard to insert a hyphen (or hyphen data) at the split position. On the other hand, if the automatically moved word is not split at an appropriate or proper split position, the split position changing means is operated to change the inappropriate split position to an appropriate one, and subsequently a hyphen is located at the new, appropriate position. Additionally, where a hyphen already (naturally) occurs in the front character row and the word can be properly split by changing the split position, only the split position changing means is operated (to move the split to the location of the natural hyphen) and no addition of any further hyphens is necessary.

As is apparent from the foregoing, the line selecting means, the character row moving means and the split position changing means cooperate with each other to serve as the hyphenation assisting device for assisting the operator to conduct the hyphenation.

In one preferred embodiment of the processing apparatus of the invention, the display device includes a cursor and the line selecting means which includes manually operable means for moving the cursor on the display device, the line selecting means selecting one of the character lines which is currently designated by the cursor. In this embodiment, a character line is easily selected for the hyphenation assisting operation.

In another embodiment of the processing apparatus of the invention, the display device includes a cursor and the split position changing means includes manually operable means for moving the cursor on the display device, the split position changing means changing the split position to a position designated by the cursor. In this embodiment, the split position is easily changed to a new split position.

In still another embodiment of the processing apparatus of the invention, the edited data producing means justifies each character line whereby the right- and left-hand ends of the each character line are aligned with the right- and left-hand margin lines, respectively, while the character row moving means determines the maximum number with respect to the selected character line in a supposed situation as if the selected character line were not justified. In this embodiment, the hyphenation may be conducted irrespective of whether or not the selected character line has been justified.

In yet another embodiment of the processing apparatus of the invention, the character row moving means moves the front character row from the next character line to the selected character line such that a blank having a size corresponding to that of a character is kept at a position following the last character of the moved front character row, adjacent to the one margin line and inside the document zone, the blank corresponding to the split position. In this embodiment, a hyphen is easily entered at the blank by operating the hyphen key on the keyboard, if the automatically moved word is properly split at the space.

The processing apparatus of the invention may further comprise split word display control means for displaying on the display device the split word consisting of the front character row in the selected character line and the rear character row in the next character line, in a manner different from a manner in which the words other than the split word are displayed. In this embodiment, the operator can easily distinguish the automatically moved words from the other words even though they have been split.

In another preferred embodiment of the processing apparatus of the invention, the split position changing means includes manually operable means for changing the split position to a new split position and alarm means for informing that the operation of the manually operable means to change the split position is inappropriate if the new split position is to be located outside the hot zone. This alarm means serves to prevent the hyphenation from being conducted outside the hot zone.

The processing apparatus of the invention may further comprise character row returning means manually operable for returning the front character row from the selected character line to the next character line without modifying the front character row so as to restore the automatically moved word to the next character line. In this embodiment, the split word is readily restored to its original form in the case where the operator has judged that it is inappropriate to conduct the hyphenation on the word.

In still another embodiment of the processing apparatus of the invention, the input device comprises a hyphen key for entering data representing a hyphen, the edited data producing means comprising hyphen insert means for inserting the hyphen at the new split position, if the hyphen key is operated immediately after a new split position is established in the front character row by the split position changing means and for returning the characters following the front character row which are located after the new split position to the next character line so as to join the following characters to the characters of the rear character row. In this embodiment, the operator is not required to delete the following characters of the front character row after the split position or insert data representing the deleted characters in the next line. Accordingly, the productivity of the edited document data is improved.

In yet another embodiment of the processing apparatus of the invention, the line selecting means selects the next character line if data representing a hyphen is entered to locate the hyphen at the split position in the selected character line. In this embodiment, the operator is not required to operate any keys to select the next character line after conducting the hyphenation in the selected line. In a modified form of this embodiment, the line selecting means may be adapted to select the next character line if the maximum number with respect to the selected character line is less than a number of columns constituting the hot zone. In the modified form, the character lines which would not need the hyphenation are automatically skipped, accordingly the operator has only to wait for the processing apparatus to find the character line which would need the hyphenation.

The processing apparatus of the invention may further comprise mode switching means for selectively placing the editing device in a hyphenation assisting mode in which the line selecting means, the character row moving means and the split position changing means are operated and a non-hyphenation assisting mode in which none of the line selecting mode, the character row moving means and the split position changing means are operated. It is preferred that the hyphenation assisting mode be automatically switched to the non-hyphenation assisting mode if the line selecting means selects the last line of the plurality of character lines represented by the edited document data.

Where the processing apparatus has a document data storing device for storing document data in memory means such as a floppy disk and is capable of utilizing the document data as original data, the document data storing device serves as the original document data input device since the original document data is entered from the document data storing device.

BRIEF DESCRIPTION OF THE DRAWINGS

The above and optional objects, features and advantages of the present invention will be better understood by reading the detailed description of presently preferred embodiment of the invention, when considered in conjunction with the accompanying drawings, in which.

DETAILED DESCRIPTION OF THE PREFERRED EMBODIMENT

There will be described in detail a document data processing apparatus of the present invention which is embodied in an English-writing word processor.

Figure 1:
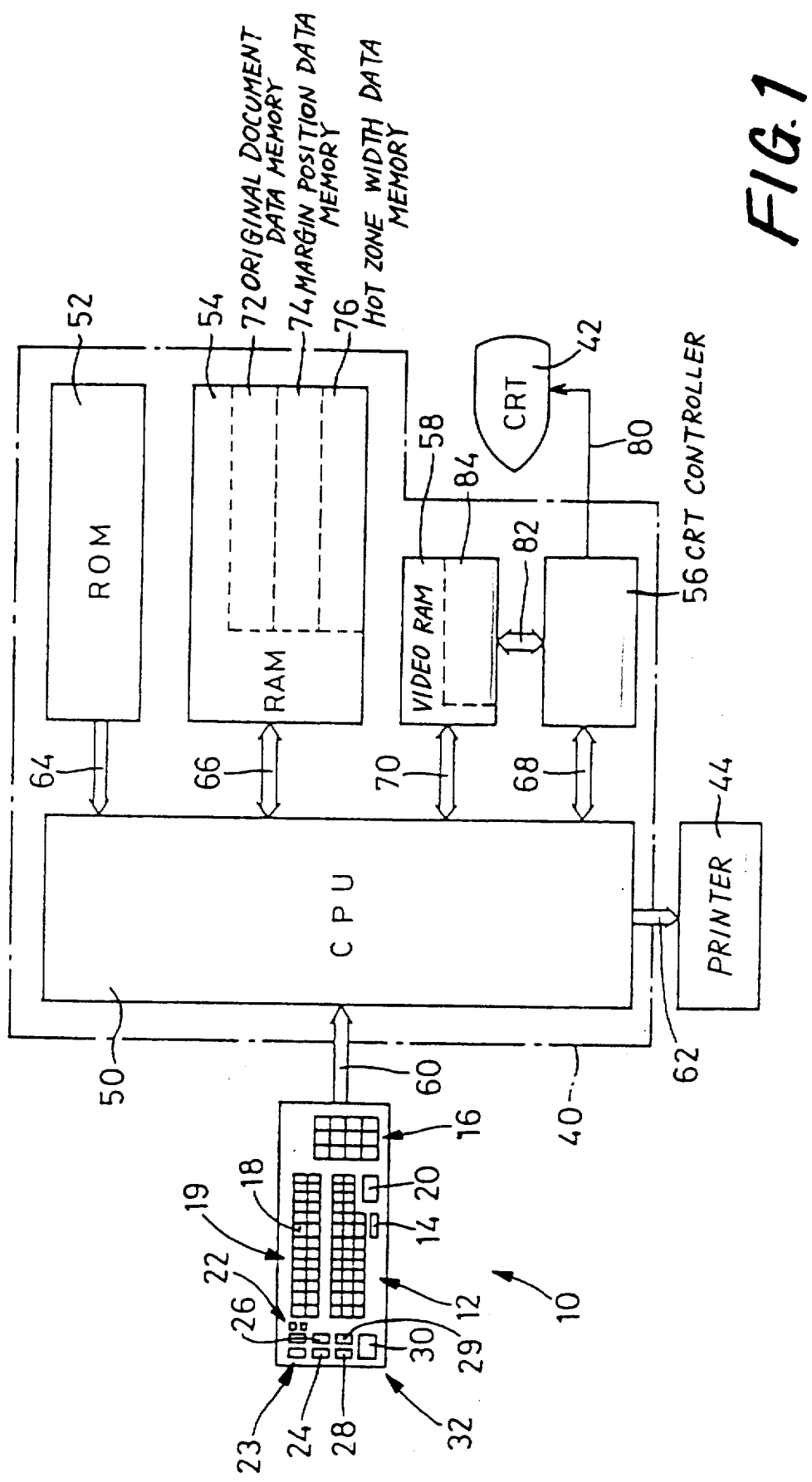
FIG. 1 is an explanatory diagrammatic view of the document data processing apparatus of the present invention which is embodied in an English-writing word processer.

Referring first to FIG. 1, there is shown an input device in the form of a keyboard generally indicated at 10. The keyboard 10 has a multiplicity of character keys 19 including English letter keys 12, a space key 14, numeral keys 16, and a hyphen key 18. The keyboard 10 further has a multiplicity of function keys 32 including a return key 20, a cursor upward/downward moving key 22 (hereinafter referred to as "CURSOR U/D key"), a cursor leftward/rightward moving key 23 ("CURSOR L/R key"), a left margin establishing key 24 ("LM key"), a right margin establishing key 26 ("RM key"), a hot-zone establishing key 28 ("Hz key"), a justification mode on/off key 29 ("JUSTIFY key"), a hyphenation assisting mode on/off key 30 ("HYPHEN key"). The function of each of the Hz key 28, JUSTIFY key 29 and HYPHEN key 30 will be described below.

The keyboard 10 is connected to a main control device 40 to which a CRT (cathode ray tube) 42 and a printer 44 is connected.

The main control device 40 has a computer including a CPU (central processing unit) 50, a ROM (read only memory) 52 and a RAM (random access memory) 54. The main control device 40 further has a CRT controller 56 and a video RAM 58. The keyboard 10, printer 44, ROM 52, RAM 54, CRT controller 56, and video RAM 58 are coupled to the CPU 50 via respective buses 60, 62, 64, 66, 68, and 70.

The ROM 52 stores various control programs such as a program for effecting storing of original document data representing an original document including a plurality of words, a program for effecting revision of the original document data, a program for effecting production of edited document data, and a program for effecting a hyphenation assisting operation. The RAM 54 has an original document data memory 72 for storing original document data entered through the keyboard 10, a margin position data memory 74 for storing data representing positions of a left- and a right-hand margin column (hereinafter referred to as "LM column" and "RM column", respectively; see FIG. 5), and a hot zone width data memory means 76 for storing data representing a width (number of columns) of a hot zone Hz. The feature of each of the LM and RM columns and the hot zone will be described below.

The CRT 42 and the video RAM 58 are coupled to the CRT controller 56 via a lead 80 and a bus 82, respectively. Each of the CRT controller 56 and video RAM 58 employed is of a type well known in the art, accordingly detailed description thereof is skipped.

When original document data is entered through the keyboard 10 of the word processor constructed as described above, the CPU 50 utilizes the previously-indicated original document data storing program in the ROM 52 for storing the entered data in the original document data memory 72 in the RAM 54. Further, when the LM and RM keys 24, 26 are operated, the CPU 50 operates for storing in the margin position data memory 74 data representing the positions of the LM and RM columns on the CRT 42. The LM and RM columns cooperate with each other to define therebetween a document zone whose width corresponds to a length of a predetermined number of characters and in which a plurality of character lines each consisting of words, spaces, periods, hyphens, etc. are arranged one line by one from top to bottom. Moreover, when data representing the width of the hot zone Hz is entered after the Hz key 28 is operated, the data is stored in the hot zone width data memory 76 in the RAM 54. The hot zone Hz consists of a predetermined number of columns up to the RM columns including the RM column. In the instant embodiment, the document zone includes the LM and RM columns as the head and last columns thereof. Accordingly, the LM and RM columns themselves, or a left-hand edge line of the LM column and a right-hand edge line of the RM column, correspond to the left- and right-hand margin lines which define therebetween the document zone and which no word is permitted to intersect in the automatic line feed operation (described below). However, it is possible to define the document zone so as to not include the LM and RM columns, so that no character is permitted to be located at the LM and RM columns in the automatic line feed operation, that is, so that the LM and RM columns are left blank. In this case, the LM and RM columns themselves, or a right-hand edge line of the LM column and a left-hand edge line of the RM column, correspond to the above-indicated left- and right-hand margin lines, and data representing the positions of such "blank" LM and RM columns are stored as the margin position data in the memory 74 in the RAM 54.

The CPU 50 utilizes the previously-indicated edited document data producing program in the ROM 52 and the data stored in the memories 74, 76, for editing the original document data stored in the memory 72 into edited document data, which is stored in an edited document data memory 84 in the video RAM 58. An edited document corresponding to the edited document data in the memory 84 is displayed on the CRT 42.

Usually, the edited document data is produced while the word processor is placed in an automatic line-feed mode thereof. In the automatic line-feed mode, a word (or word data) which would otherwise be positioned in each character line to follow a word terminating within a predetermined area adjacent to the RM column inside the document zone or would otherwise be positioned in the character line such that the word starts at a column outside the hot zone Hz and intersects or overruns the RM column, actually is automatically moved to the following character line. This predetermined area corresponds to the previously-indicated hot zone Hz. In the present embodiment, space data or hyphen data in the original document data functions as line-feed command data. If such line-feed command data is located in the hot zone Hz, a cursor 94 (FIG. 4) is automatically moved on the CRT 42 to the head column of the following character line. Accordingly, word data which would otherwise follow the line-feed data in a character line is actually located at the following character line. Similarly, if a word is located in a character line which starts at a column outside the hot zone Hz, occupies all the columns within the hot zone Hz, and would otherwise intersect or overrun the RM column, the word actually is automatically moved to the following character line. Thus, an edited document consisting of a plurality of character lines is arranged within the document zone between the LM and RM columns on the CRT 42, such that none of the words in the displayed document is split into a front character row in a character line and a rear character row in the following character line. It is noted that, if a word terminates at the last column or RM column in a character line and a space (space data) is entered to follow the word, the word is not moved to the following character line, that is, the word remains in that character line, and the space is not realized in the document zone.

Figure 4:
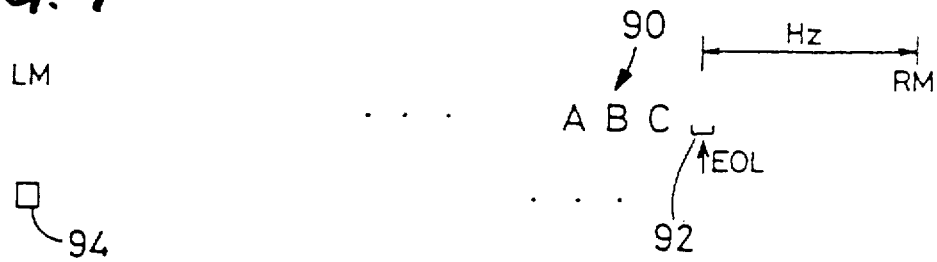
FIG. 4 represents an automatic line feed operation wherein a cursor is automatically moved to a subsequent line if line-feed command data is located within a hot zone.

The automatic line feed effected on the instant word processor will be described in more detail by reference to FIGS. 4–6. As shown in FIG. 4 if space data 92 (indicated at symbol ⌴) is entered to be located within the hot zone Hz after word data 90 representing a word consisting of characters "ABC" are entered, the cursor 94 (indicated at symbol ☐) is automatically moved to the head column of the next character line. In this case, a word to follow the space 92 is treated as the automatically moved word (hereinafter referred to as "AM word"). Meanwhile, in FIG. 5 there is shown word data 96 representing a word consisting of characters "DEFGHIJKL". The word data 96 starts at the character "D" located at a column outside the hot zone Hz and continues to intersect or overrun the RM column at the character "L". As soon as the character "L" is entered following the character "K", however, the entirety of the word data 96 is automatically moved to the vicinity of the LM column including the LM column, in the following character line. In this case, the word "DEFGHIHKL" is treated as the AM word. If word data 98 corresponding to a word "DEFGHIJK" is entered as shown in FIG. 6 such that the last character "K" is located at the last column of the hot zone (i.e., RM column), the word "DEFGHIJK" 98 is not moved.

If the JUSTIFY key 29 is operated while the instant word processer is placed in the automatic line feed mode, the processer is concurrently placed in a justification mode thereof. In the justification mode, a blank portion which may be left in a character line in the vicinity of the RM column due to the automatic line feed, is eliminated by distribution thereof to each of the spaces between words in the character line, so that the last character of the last word in the line is aligned with the RM column. As a result, all the spaces are widened by substantially the same length. When the word processer operates in the justification mode while also being in the automatic line feed mode, the edited document is produced such that it has a good external appearance since the right hand ends of almost all the character lines are aligned with the RM column.

Figure 7:
FIG. 7 represents a character line prior to having a justification operation performed thereon.
Figure 8:
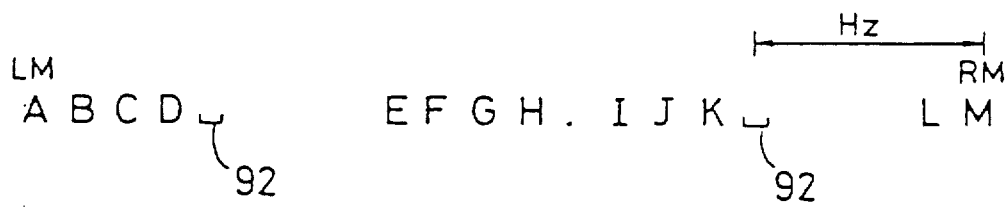
FIG. 8 represents a character line after having a justification operation performed thereon.

The justification operation will be described by reference to FIGS. 7 and 8. If the character line is justified which includes a plurality of words as shown in FIG. 7, the last character "M" of the last word "LM" is moved to the RM column.

There will be described the hyphenation assisting mode ("HYPHEN mode") of the instant word processer. If the operator operates the HYPHEN key 30 after selecting one of the character lines by designating that line using the cursor 94 on the display 42, the word processer is placed in the HYPHEN mode while remaining in the automatic line feed mode and/or the justification mode. In the HYPHEN mode, the CPU 50 utilizes the previously-indicated hyphenation assisting program stored in the ROM 52, which will be described below by reference to the flow charts of FIGS. 2 and 3.

Figure 2:
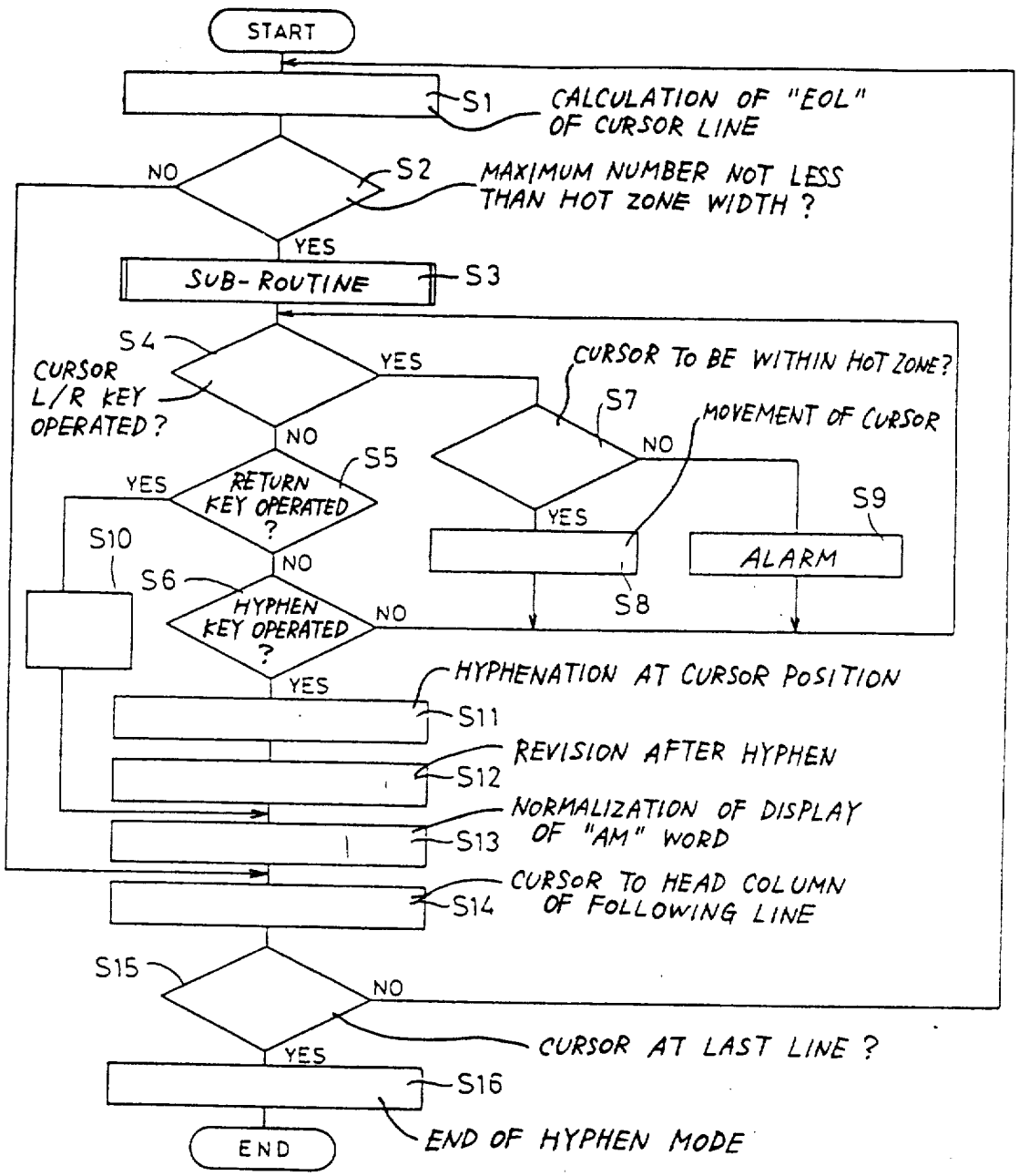
FIG. 2 is a flow chart representing a control program for effecting the hyphenation assisting operation in the apparatus of FIG. 1.

When one of the character lines is selected by operating the HYPHEN key 30 with that line designated by the cursor 94, the CPU 50 enters step S1 of FIG. 2 to calculate a position or column "EOL" of a space following the last word in the selected character line (hereinafter referred to as "CURSOR line") or the last character of the last word in the CURSOR line. The position "EOL" means the position of the last space or the last character in a supposed (or theoretical) situation which would exist if the CURSOR line were not justified, even though the CURSOR line has already been justified. That is, the number of blank character spaces, or the position of the last word character is determined as if no justification had taken place.

Step S1 is followed by step S2 to calculate a maximum number of the characters which can be located in the vicinity of the RM column inside the document zone by means of subtracting a value of the position "EOL" (where "EOL" means the position of the last space) or a value of the position "EOL" plus one (where "EOL" means the position of the last character of the last word) from a value of the position of the RM column. At step S2, it is also determined whether or not the maximum number with respect to the selected character line is not less than the width (number of columns) of the hot zone Hz.

Where a CURSOR line is followed by data entered through operation of the return key 20, step S1 shows that the position "EOL" is equal to that of the RM column, whereby that CURSOR line is prevented from the hyphenation assisting operation. The affirmative judgement ("YES") at step S2 means that the CURSOR line needs the hyphenation assisting operation to be performed thereon. Consequently, step S2 is followed by step S3. On the other hand, the negative judgement ("NO") at step S2 means that the CURSOR line does not need the hyphenation assisting operation to be performed thereon. In this case, the following steps S3 through S13 are skipped, and the CPU control goes to step S14.

Figure 3:
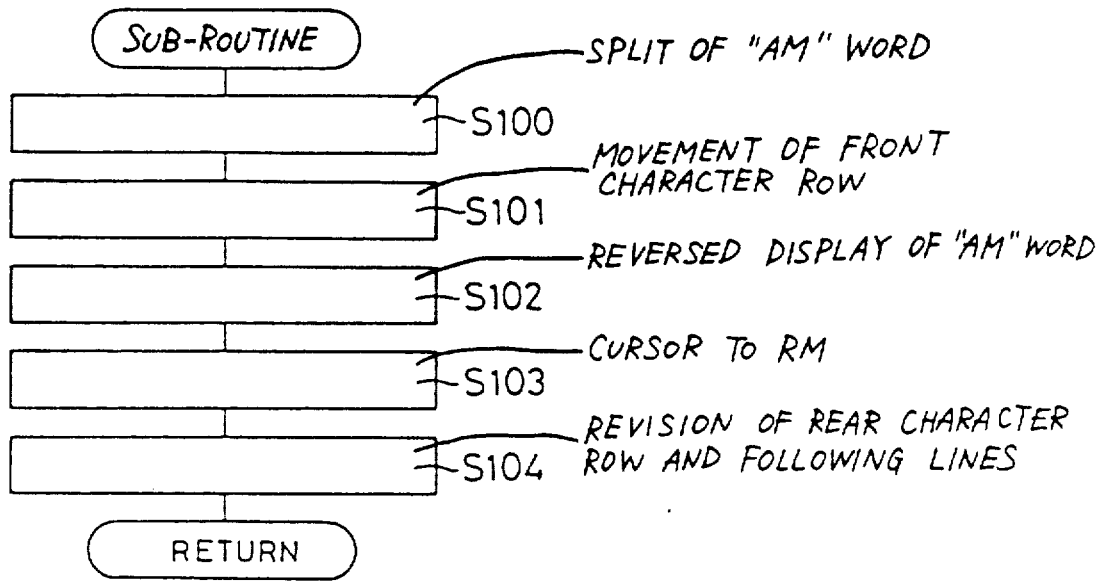
FIG. 3 is a flowchart representing a subroutine performed by the program represented in FIG. 2.

In the case where the result of step S2 is affirmative, the CPU control goes to step S3 to execute the subroutine of the flow chart of FIG. 3. At step S100, the AM (automatically moved) word in the next character line following the CURSOR line is split into a front character row and a rear character row, such that a number of the characters of the front character row is equal to a value given by subtracting one from the maximum number obtained at step S2.

Step S100 is followed by step S101 to move the front character row from the next character line to the CURSOR line. As a result, the edited document data in the memory 84 of the RAM 54 is revised so that one space or a blank having a size corresponding to one character is provided after the last character of the moved front character row. This blank corresponds to the split position at which the AM word is split into the front and rear character rows. Where the CURSOR line has already been justified through operation of the JUSTIFY key 29, the front character row is moved to the CURSOR line after the CURSOR line has been restored to an original line configuration thereof prior to the justification. Subsequently, step S102 is executed to revise the edited document data so that the split AM word is displayed in a manner different from a normal manner in which the words other than the AM word are displayed. In the instant embodiment, the split AM word is displayed in a reversed manner in which the color of the characters and the color of the background around the characters are reversed to each other as contrasted with the normal manner. Step S102 is followed by step S103 to displace the cursor 94 to the RM column in the current CURSOR line, and then the CPU control goes to step S104 to revise a portion of the edited document data which includes the next character line and the following lines, by utilizing the edited document producing program stored in the ROM 52. Subsequently, the CPU control advances to step S4 of the flow chart of FIG. 2.

At the loop of steps S4 through S6 it is repeatedly judged whether or not the CURSOR L/R key 23, return key 20 and hyphen key 18 have been operated, respectively. When the return key 20 or hyphen key 18 is operated, the CPU control leaves the loop.

Where the above-indicated split position, i.e., the blank at the RM column currently designated by the cursor 94, is not proper or suitable to locate a hyphen thereat, the operator will operate the CURSOR L/R key 23 to displace the cursor 94 to a proper or suitable position or column. In such case, the judgement at step S4 is found to be affirmative ("YES"). Consequently, step S4 is followed by step S7 to judge whether or not the cursor 94 would be located within the hot zone Hz if the cursor 94 is moved according to the operation of the CURSOR L/R key 23. Where the judgement at step S7 is affirmative ("YES"), step S7 is followed by step S8 to actually move the cursor 94. Where the judgement at step S7 is negative ("NO"), however, the cursor 94 is not moved and step S9 is executed to command a buzzer (not shown) to alarm for a predetermined time duration and to inform the operator of the inappropriate operation of the key 23. Irrespective of the judgement at step S7, the CPU control returns to the loop of steps S4–S6.

In order to prevent the CURSOR line from being subject to the hyphenation assisting operation, the operator has only to operate the return key 20. Upon operation of the return key 20, the judgement at step S5 is turned affirmative ("YES"), whereby at the following step S10 the front character row moved to the current CURSOR line at step S101 of FIG. 3, is returned to the following character line to restore the AM word to the following character line. Thus, the CURSOR line restores its line configuration before entering the hyphen assisting operation, i.e., after the automatic feed line or justification. Step S10 is followed by step S13 to normalize the display of the AM word reversed at Step S102 of FIG. 3, i.e., display the AM word in the normal manner in which the words other than the AM word are displayed.

Upon operation of the hyphen key 18 when the cursor 94 is located at a position (column) suitable to locate a hyphen, the judgement at step S6 is turned affirmative ("YES"), and the following step S11 is executed to revise the edited document data in the memory 84 of the video RAM 58 and the original document data in the memory 72 of the RAM 54 so that data representing the hyphen is inserted at the position designated by the cursor 94. Subsequently, at step S12 a portion of the edited document data following the inserted hyphen data is revised. In this process, the characters of the front character row following the inserted hyphen are returned to the next character line to be joined to the rear character row of the AM word. Step S12 is followed by step S13 to normalize the reversed display of the AM word. In the instant embodiment, the edited document data stored in the memory 84 in the video RAM 58 represents only the edited document displayed on the CRT 42, and the original document data stored in the memory 72 of the RAM 54 is so revised as to correspond to the edited document data revised on the CRT 42.

Figure 5:
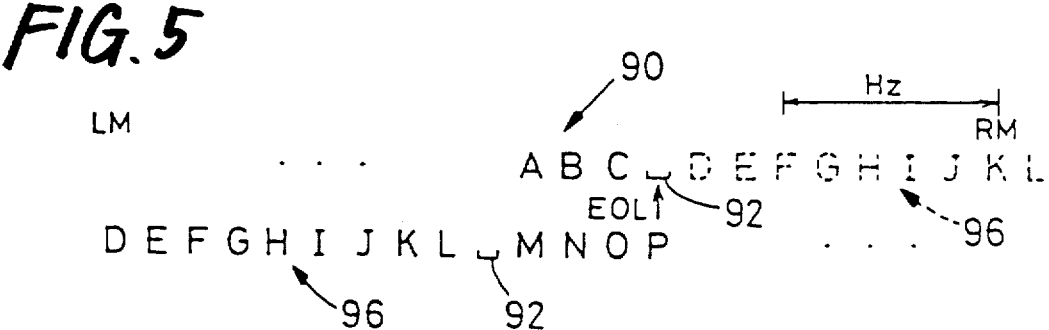
FIG. 5 represents word data which would overrun a right-hand margin if it were not at least partially moved to a subsequent line.
Figure 6:
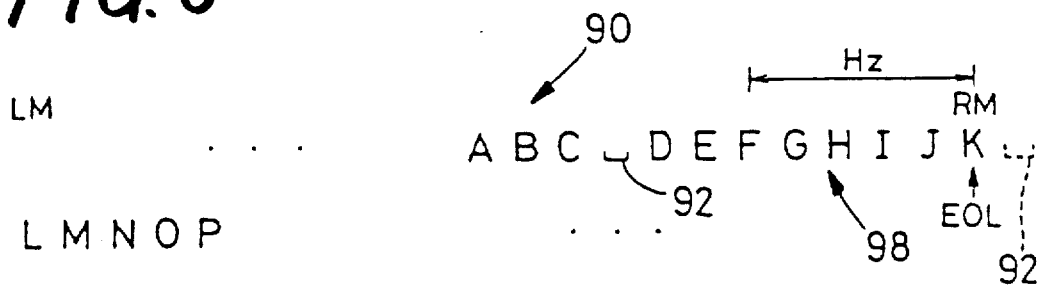
FIG. 6 represents word data whose last character is located within a hot zone.
Figure 9:
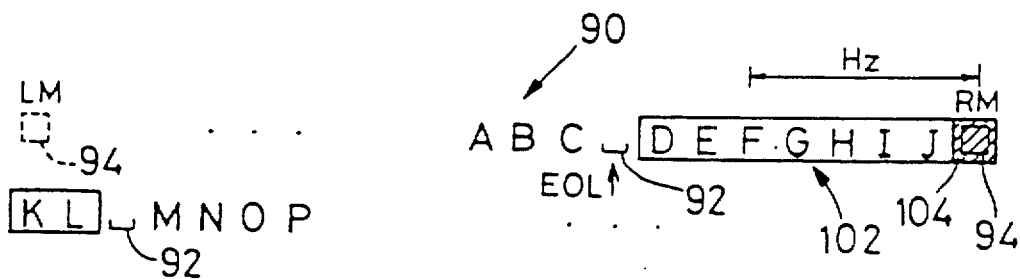
FIG. 9 represents movement of a front character row from a word previously automatically located in a subsequent line to a previous line according to the present invention.
Figure 10:
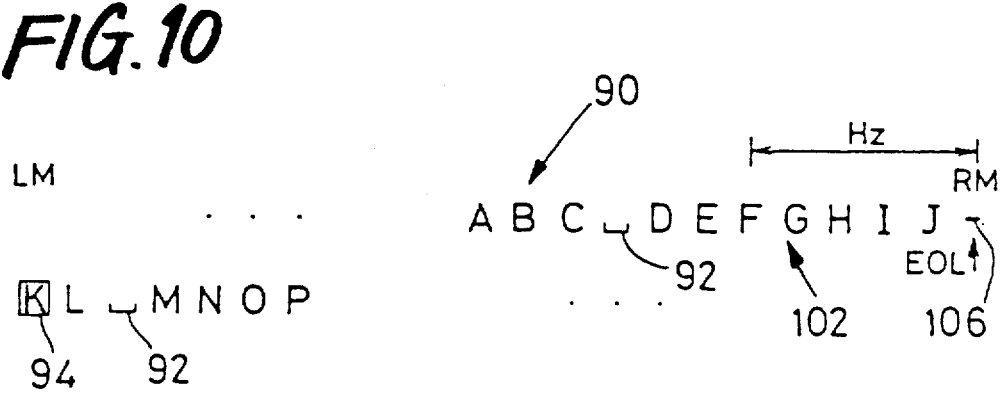
FIG. 10 represents the insertion of a hyphen after the front character row of FIG. 9.
Figure 11:
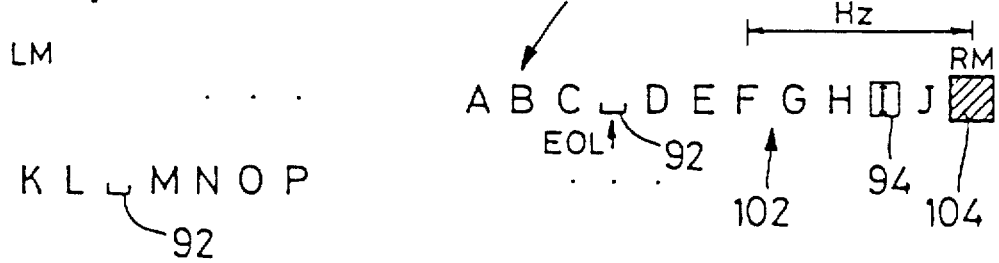
FIG. 11 represents the selection of a new split position for the front character row of FIG. 9.
Figure 12:
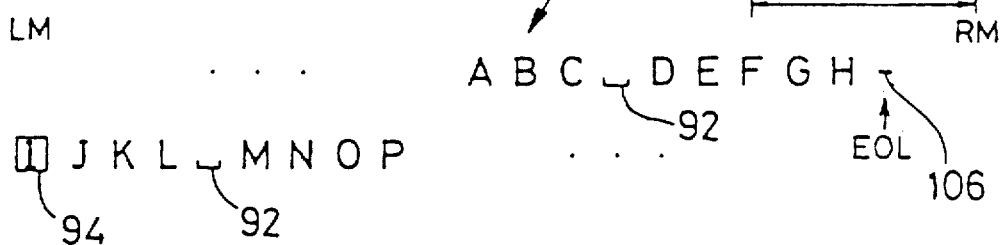
FIG. 12 represents the insertion of a hyphen at the new split position of FIG. 11.

The hyphenation assisting operation as described above will be illustrated concretely by reference to FIG. 5 and FIGS. 9-12. First, the cursor 94 is displaced on the CRT 42 to the upper character line shown in FIG. 5. Upon operation of the HYPHEN mode key 30, the upper character line is selected to be subjected to the hyphenation assisting operation, since the upper character line has a comparativley large blank following the last word thereof. Consequently, data 102 representing the front character row "DEFGHIJ" out of data 96 representing the AM word "DEFGHIJKL" located in the next, lower character line in FIG. 5, is moved to the upper line such that one blank 104, indicated at shadowed square ▨ in FIG. 9, is provided at the RM column following the last character "J" of the front character row "DEFGHIJ". Further, the cursor 94 is displaced to the position of the blank 104. If the hyphen key 18 is operated in this situation, data representing a hyphen is inserted in the blank 104 as shown in FIG. 10. However, where the AM word is improperly or unsuitably split at the blank 104, it is required that the split position be changed to a new split position in the front character row in the upper, CURSOR line, as shown in FIG. 11. In the instant example, the new split position is easily changed by operating the CURSOR L/R key 23 and thereby moving the cursor 94 to a proper hyphenation position or column, as shown in FIG. 12.

Following completion of steps S1-S13 of FIG. 2, the CPU control goes to step S14 to revise the edited document data so that the cursor 94 is positioned at the head column of the next, lower character line, and subsequently to step S15 to determine whether or not the cursor 94 is positioned at the last character line of the edited document data. Where the judgement at step S15 is negative ("NO"), the CPU control returns to step S1. Thus, the character lines following the initially selected character line are subjected, one line by one and downwards, to the hyphenation assisting operation. Once the judgement at step S15 is turned affirmative ("YES"), the step S15 is followed by step S16 to place the instant word processor out of the HYPHEN mode. Thus, the hyphenation assisting operation is terminated.

If the HYPHEN key 30 is operated again while the word processor operates in the HYPHEN mode, the device is placed out of the HYPHEN mode. i.e., switched from the HYPHEN mode to a non-HYPHEN mode thereof.

When a print key (not shown) on the keyboard 10 is operated, an edited document corresponding to the edited document data on the CRT 42 is printed out by the printer 44.

As is apparent from the foregoing, in the instant embodiment, a portion of the computer of the main control device 40 which stores the original document storing program, a portion of the computer which executes the program and the original document data memory 72 of the RAM 54 cooperate with each other to serve as the original data memory means. A portion of the above computer which stores the edited document data producing program, a portion of the computer which executes the program and the edited document data memory 84 of the video RAM 54 cooperate with each other to serve as the edited data producing means. The CURSOR U/D key 22, a portion of the above computer which controls the displacement of the cursor 94 according to the operation of the key 22, a portion of the computer which stores steps S14 and S15 of the program of FIG. 2, and a portion of the computer which executes those steps cooperate with each other to serve as the line selecting means. A portion of the above computer which stores steps S1, S2 of the program of FIG. 2 and steps S100, S101 of the program of FIG. 3, and a portion of the computer which executes those steps cooperate with each other to serve as the character row moving means. The CURSOR L/R key 23, a portion of the above computer which controls the displacement of the cursor 94 according to the operation of the key 23, a portion of the compute which stores steps S4, S7-S9 of the program of FIG. 2, and a portion of the computer which executes those steps cooperate with each other to serve as the split position changing means. The CRT 42, the CRT controller 56 and portions of the above computer and video RAM 54 which operate the controller 56, cooperate with each other to serve as the display device.

While the preferred embodiment of the document data processing apparatus of the present invention has been illustrated, it is to be understood that the invention may be embodied with various modifications.

While the description of the illustrated embodiment relates to the original document which consists of same size characters, it is possible to effect the hyphenation assisting operation with respect to a document which includes different size characters such as "H2O" in which the character "2" occupies half the space of the standard characters "H" and "O". In this case, the smaller character "2" is counted 0.5 if the standard character is counted 1, and a fraction less than 1 is cut or ignored in determining the maximum number with respect to the CURSOR line.

While in the illustrated embodiment the width of the hot zone Hz is adjustable to a suitable value, it is possible to store in the ROM 52 data indicative of a predetermined width of the hot zone Hz.

In the illustrated embodiment, upon operation of the hyphen key 18 while the processer operates in the HYPHEN mode, a portion of the edited document data following the thus-inserted hyphen data 106 is automatically revised according to the predetermined document form. However, it is possible to adapt the processer not to effect such revision even upon operation of the hyphen key 18 unless another key such as an insert key has been operated already.

Furthermore, in the illustrated embodiment a hyphen must be inserted anywhere in the front character row of the split AM word unless the split AM word is restored to its original form upon operation of the return key 20. However, it is possible to provide the processer with a split key and insert between steps S5 and S6 of the flow chart of FIG. 2 an additional step at which it is judged whether or not the split key has been operated. Upon operation of the split key when the cursor 94 is placed at a suitable position in the front character row of the split AM word, one blank is located at that position and the CPU control goes to step S12 while bypassing the steps S6 and S11. Where the judgement at the additional step is negative, on the other hand, the CPU control returns to step S6. For example, in the case where the front character row includes a hyphen already, the split key is used for splitting the word at the hyphen.

The principle of the present invention is applicable to a word processer of a type which does not have a hot zone as described in the illustrated embodiment. In this case, only a word which would otherwise be positioned in a character line to overrun the document zone, is automatically moved to the following character line due to the automatic line feed.

While the present invention has been illustrated with particularities of the preferred embodiment and the modified examples, it is to be understood that the invention may be embodied with other modifications and various improvements and changes that may occur to those skilled in the art without departing from the spirit and scope of the invention as defined in the appended claims.

What is claimed is:

1. A document data processing apparatus comprising:
    an input device for entering original document data;
    an editing device connected to said input device, for editing said original document data from said input device into edited document data;
    and a display device connected to said editing device, for displaying an edited document corresponding to said edited document data,
    said editing device comprising
    original data memory means for storing said original document data,
    edited data producing means for producing said edited document data represented as a plurality of character lines arranged within a document zone which is defined by, and between, a pair of right- and left-hand margin lines located at respective predetermined positions, by automatically moving each word which would be positioned in each character line to intersect one of said margin lines or would be positioned in said each character line to follow a word terminating within a hot zone adjacent to said one of the margin lines inside said document zone, to a next character line following said each character line;
    line selecting means for selecting one of said character lines represented by said edited document data as a selected character line;
    character row moving means for splitting the automatically moved word in said next character line following the selected character line, into a front and a rear character row, such that a number of the characters of said front character row is equal to a value corresponding to, and not more than, a maximum number of the characters which can be located in said selected character line in the vicinity of said one of the margin lines without overrunning said one margin line had said automatically moved word not been moved from said selected character line to said next character line, said character row moving means also being for moving said front character row from said next character line to said vicinity of said one margin line in said selected character line; and
    split position changing means for changing the split position at which said automatically moved word is split into said front and rear character rows, after said front character row has been moved from said next character line to said selected character line.

2. The apparatus as set forth in claim 1, wherein said display device includes a cursor and said line selecting means includes manually operable means for moving said cursor on said display device, said line selecting means selecting one of said character lines which is currently designated by said cursor.

3. The apparatus as set forth in claim 1, wherein said display device includes a cursor and said split position changing means includes manually operable means for moving said cursor on said display device, said split position changing means changing said split position to a position designated by said cursor.

4. The apparatus as set forth in claim 1, wherein said edited data producing means justifies said each character line whereby the right- and left-hand ends of said each character line are aligned with said right- and left-hand margin lines, respectively, said character row moving means determining said maximum number as if said selected character line were not justified.

5. The apparatus as set forth in claim 1, wherein said character row moving means moves said front character row from said next character line to said selected character line such that a blank is kept at a position following a last character of the moved front character row, adjacent to said one margin line and inside said document zone, said blank corresponding to said split position.

6. The apparatus as set forth in claim 1, further comprising
    split word display control means for displaying on said display device the split word consisting of said front character row in said selected character line and said rear character row in said next character line, in a manner different from a manner in which the words other than said split word are displayed.

7. The apparatus as set forth in claim 1, wherein said split position changing means includes
    manually operable means for changing said split position to a new split position; and
    alarm means for informing an operator that the operation of said manually operable means to change said split position to the new split position is inappropriate if said new split position is to be located outside said hot zone.

8. The apparatus as set forth in claim 1, further comprising
character row returning means manually operable to returning said front character row from said selected character line to said next character line so as to restore said automatically moved word to said next character line.

9. The apparatus as set forth in claim 1, wherein said input device comprises a hyphen key for entering data representing a hyphen, said edited data producing means comprising hyphen insert means for inserting the hyphen at a new split position, if said hyphen key is operated immediately after the new split position is established in said front character row by said split position changing means, and returning following characters of said front character row which are located after said new split position to said next character line so as to join said following characters to the characters of said rear character row.

10. The apparatus as set forth in claim 1, wherein said line as a subsequent selected line selecting means selects said next character line if data representing a hyphen is entered to locate said hyphen at said split position in said selected character line.

11. The apparatus as set forth in claim 1, wherein said line selecting means selects said next character line if said maximum number with respect to said selected character line is less than a number of columns in said hot zone, a width of each of said characters corresponding to a width of each of said columns.

12. The apparatus as set forth in claim 1, further comprising
mode switching means for selectively placing said editing device in a hyphenation assisting mode in which said line selecting means, said character row moving means and said split position changing means are operated and a non-hyphenation assisting mode in which none of said line selecting means, said character row moving means and said split position changing means is operated.

13. The apparatus as set forth in claim 1, wherein a hyphenation assisting mode in which said line selecting means, said character row moving means and said split position changing means are operated, is automatically switched to a non-hyphenation assisting mode in which none of said line selecting means, said character row moving means and said split position changing means are operated, if said line selecting means selects the last line of said plurality of character lines represented by said edited document data.

* * * * *